April 21, 1931.  J. J. KELLA  1,801,923
ROTARY PLOW
Filed June 17, 1930  3 Sheets-Sheet 3
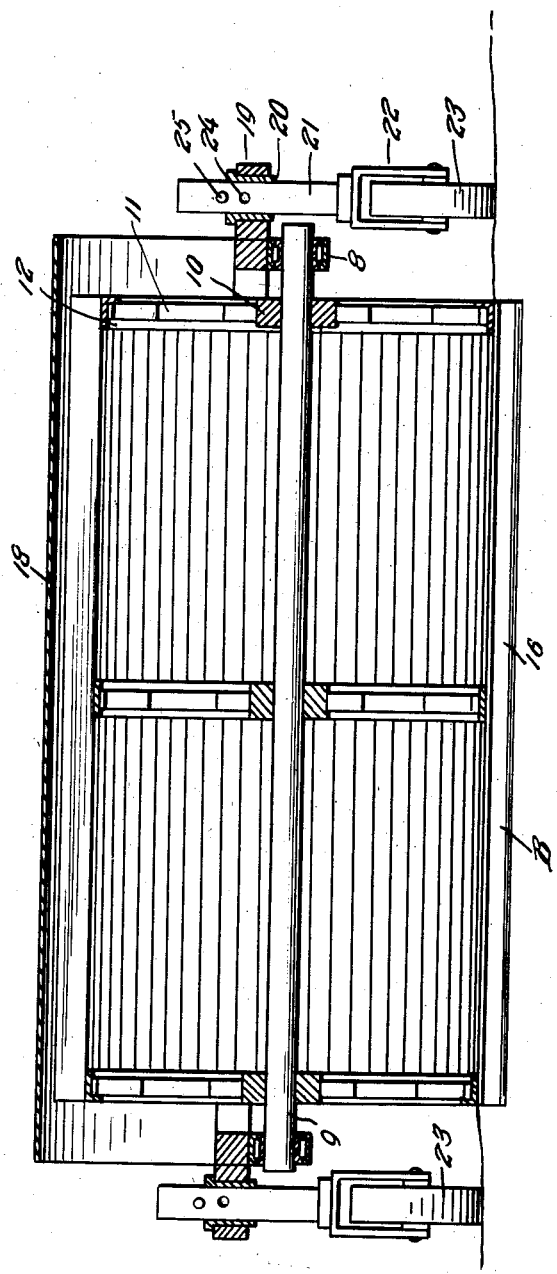
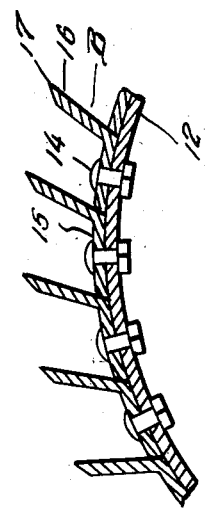
Inventor
J. J. Kella
By Clarence A. O'Brien
Attorney Patented Apr. 21, 1931

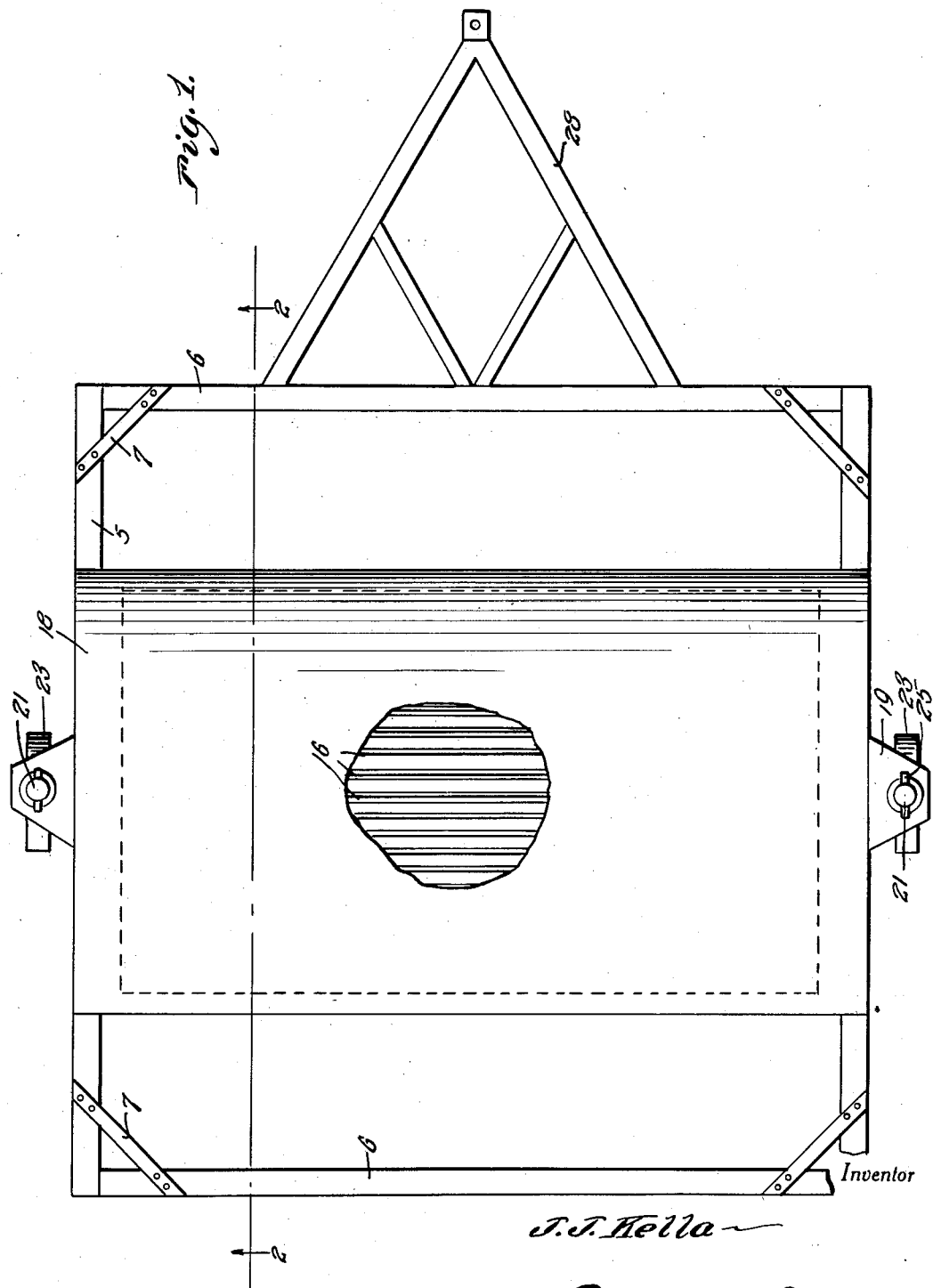

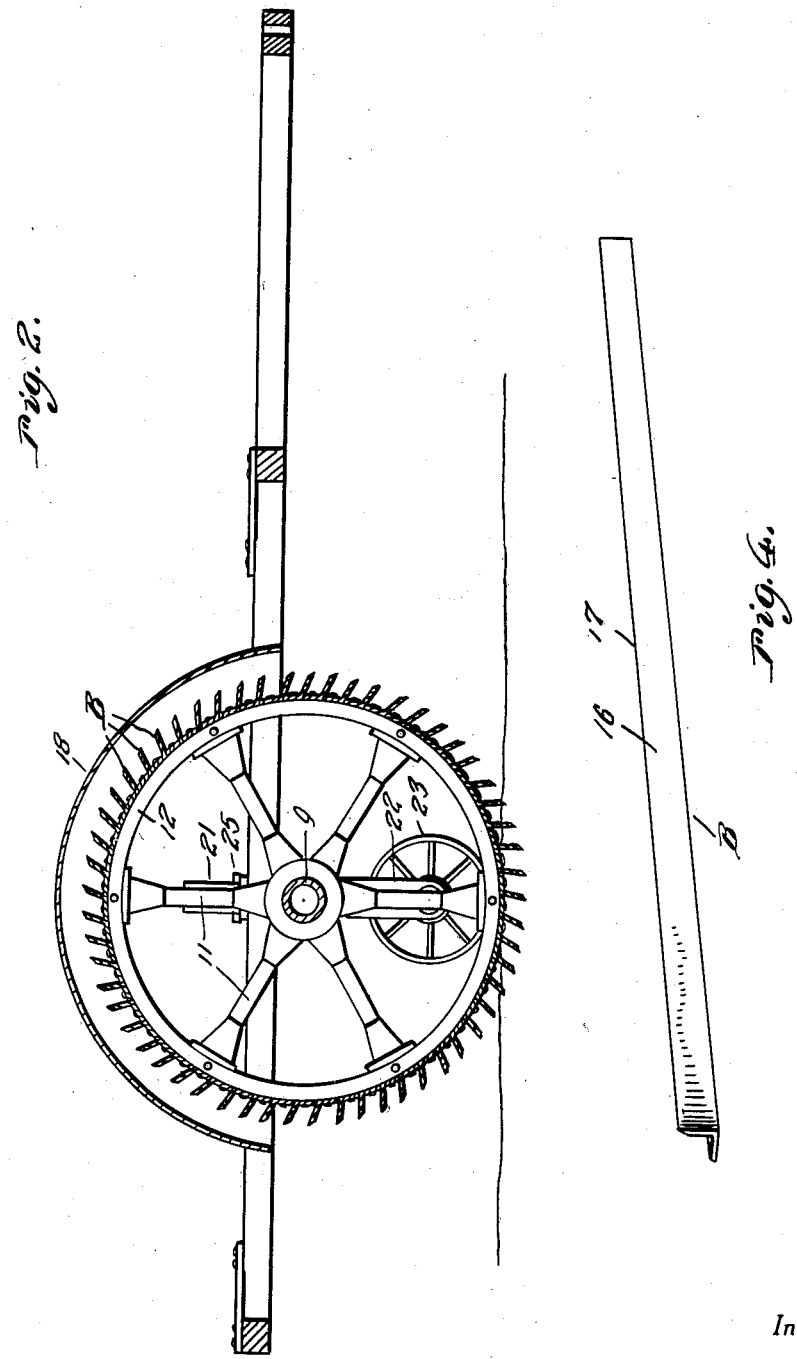

1,801,923

UNITED STATES PATENT OFFICE

JAMES J. KELLA, OF TOWNER, COLORADO

ROTARY PLOW

Application filed June 17, 1930. Serial No. 461,750.

The present invention relates to a rotary plow and has for its prime object to provide a structure which is exceedingly simple, strong and durable, comparatively inexpensive to manufacture, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a top plan view of the plow embodying the features of my invention,

Figure 2 is a vertical longitudinal section therethrough taken substantially on the line 2—2 of Figure 1, Figure 3 is a vertical transverse section therethrough, Figure 4 is a perspective view of one of the blades, and Figure 5 is an enlarged detail section taken transversely through a part of the drum or rotor.

Referring to the drawing in detail it will be seen that I utilize a rectangular frame comprising end or side bars 5 and front and rear bars 6. Suitable braces 7 are provided between the bars 5 and 6. Bearings 8 depend from the center of the bars 5 to rotatably receive a shaft 9 on which is a plurality of hubs 10 having spokes 11 radiating therefrom and fixed to their outer ends are rims 12 to which are fastened by suitable means 14 angular blades B comprising body portions 15 with blade extensions 16 obliquely disposed thereto and having their outer edges beveled as at 17.

A substantially semi-cylindrical hood 18 is mounted on the frame across the top of the rotor just described in detail.

Extensions 19 are fixed to the centers of the bars 5 to extend outwardly therefrom and have vertical bearings 20 mounted therein to receive shanks 21 rising from forks 22 between the extremities of which are journalled wheels 23. These shanks have openings 24 therein to receive pins 25. Pins 25 are disposed above the bearings 20 when the plow is in operative position. However when it is not desired to use the plow and it is to be transported from place to place then the plow is lifted and the pins 25 disposed under the bearings thereby holding the blades out of engagement with the ground so that the plow structure may be moved from place to place.

Projecting from the front bar 6 is a draft structure 28 so that the plow structure may be pulled along by a tractor or other suitable draft means.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In a device of the class described, a frame, a rotor in the frame, said rotor comprising a shaft, hubs on the shaft, spokes radiating from the hub, rings on the spokes, a plurality of angular blades fixed across the rims, each angular blade including a body portion having a blade portion projecting obliquely therefrom, the body portion being fixed to the rims and the blade portion terminating in a beveled edge, said frame having bearings depending therefrom in which the ends of the shaft are journalled, extensions on the sides of the frame disposed outwardly and having vertical bearings therein, shanks slidable in the bearings, forks at the lower ends of the shanks, wheels journalled in the forks, said shanks being provided with apertures, pins insertable through said apertures so as to be disposed above the bearings or below the bearings in the extensions.

In testimony whereof I affix my signature.

JAMES J. KELLA.